United States Patent
Tsai

(10) Patent No.: US 8,593,687 B2
(45) Date of Patent: Nov. 26, 2013

(54) PRINTER FOR PRINTING PICTURE, HAS SELECTING MODULE THAT SELECTS FRAME ON SELECTED PICTURE AND RECORDER WHICH RECORDS SELECTED PORTION OF SELECTED PICTURE SURROUNDED BY FRAME AND PRINTING MODULE PRINTS SELECTED PORTION

(75) Inventor: Teng-Yu Tsai, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 340 days.

(21) Appl. No.: 13/096,591

(22) Filed: Apr. 28, 2011

(65) Prior Publication Data

US 2012/0013924 A1    Jan. 19, 2012

(30) Foreign Application Priority Data

Jul. 16, 2010 (CN) .......................... 2010 1 0229005

(51) Int. Cl.
*G06K 1/00* (2006.01)
*B41J 2/015* (2006.01)
*G06K 9/00* (2006.01)

(52) U.S. Cl.
USPC ............. 358/1.9; 358/2.1; 358/3.1; 358/1.15; 347/29; 347/32; 382/239; 382/253

(58) Field of Classification Search
None
See application file for complete search history.

(56) References Cited

U.S. PATENT DOCUMENTS

| 2002/0036693 A1* | 3/2002 | Kinjo ............................ 348/218 |
| 2004/0151393 A1* | 8/2004 | Kurauchi ....................... 382/239 |
| 2008/0043255 A1* | 2/2008 | Wada ............................. 358/1.2 |

* cited by examiner

*Primary Examiner* — Steven Kau
(74) *Attorney, Agent, or Firm* — Altis Law Group, Inc.

(57) ABSTRACT

A printer includes a display, a storing module, a picture decoder, a selecting module, a recorder, and a printing module. The storing module is configured to store a plurality of pictures. The picture decoder is configured to read a selected picture from the storing module, decode the selected picture and display the selected picture on the display. The selecting module is configured to draw a frame to surround a selected part of the selected picture. The recorder is configured to record the position and the size of the selected part. The printing module is configured to print the selected part.

7 Claims, 3 Drawing Sheets

PRINTER FOR PRINTING PICTURE, HAS SELECTING MODULE THAT SELECTS FRAME ON SELECTED PICTURE AND RECORDER WHICH RECORDS SELECTED PORTION OF SELECTED PICTURE SURROUNDED BY FRAME AND PRINTING MODULE PRINTS SELECTED PORTION

BACKGROUND

1. Technical Field

The present disclosure relates to printers and printing methods, and particularly to, a printer and printing method for printing pictures.

2. Description of Related Art

Conventional printers can print different formats of pictures. If users want to print a section of a picture, they should cut the section of the picture and paste it as another picture. Then the section of the larger picture can be printed. This may be time consuming.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
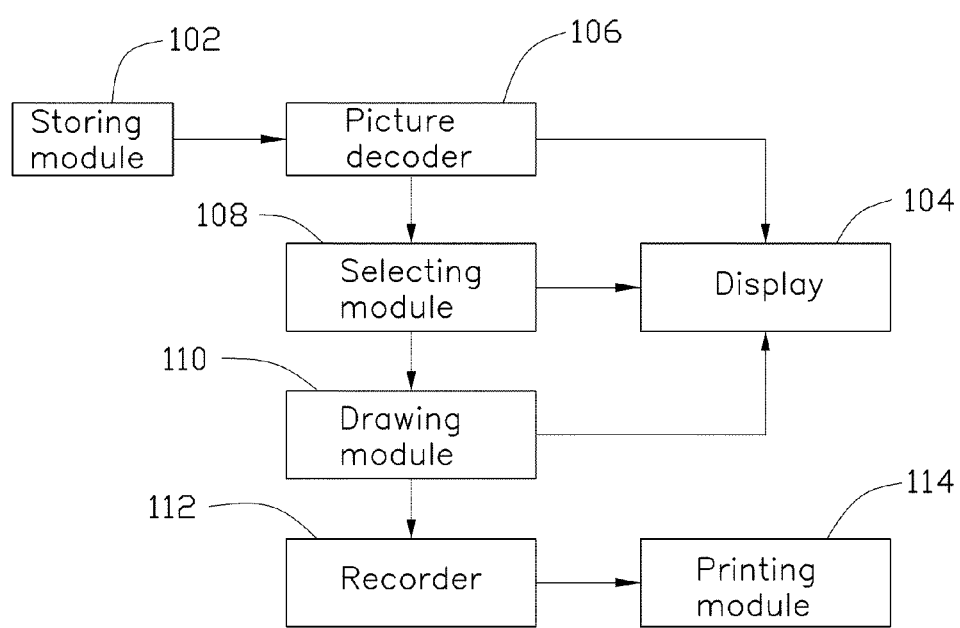
FIG. 1 is a schematic view of a printer in accordance with an embodiment.

Referring to FIG. 1, a printer includes a storing module 102, a display 104, a picture decoder 106, a selecting module 108, a drawing module 110, a recorder 112, and a printing module 114. The storing module 102 is connected to the picture decoder 106. The picture decoder 106 is connected to the display 104 and the selecting module 108. The selecting module 108 is connected to the display 104 and the drawing module 110. The drawing module 110 is connected to the display 104 and the recorder 112. The recorder 112 is connected to the printing module 114.

The storing module 102 is used for storing a plurality of pictures. The picture decoder 106 is used for reading a picture from the storing module 102, and decode the picture to a bitmap. The picture decoder 106 is further configured to obtain a width and length of the picture. The coding formats, such as BMP, JPEG, PNG, GIF, TIFF, can be decoded by the picture decoder 106. The selecting module 108 is used for drawing a frame to select a selected part of the picture. In one embodiment, the frame is rectangular. The drawing module 110 is can mask the non-selected part of the picture. The transparency of the non-selected part of the picture is determined by the value of Alpha channel. The values of the Alpha channel include 256 grades (from 0 to 255). In one embodiment, the value of the Alpha channel is 100. The recorder 112 is used for recording the selected part of the picture. In one embodiment, the recorder 112 records and stores the coordinates of four pinnacles of the frame in an extensible markup language file. The printing module 114 is configured for printing the selected part in the recorder 112. In one embodiment, the printing module 114 reads the coordinates of the selected part of the picture from the XML file and prints the selected part of the picture.

Figure 2:
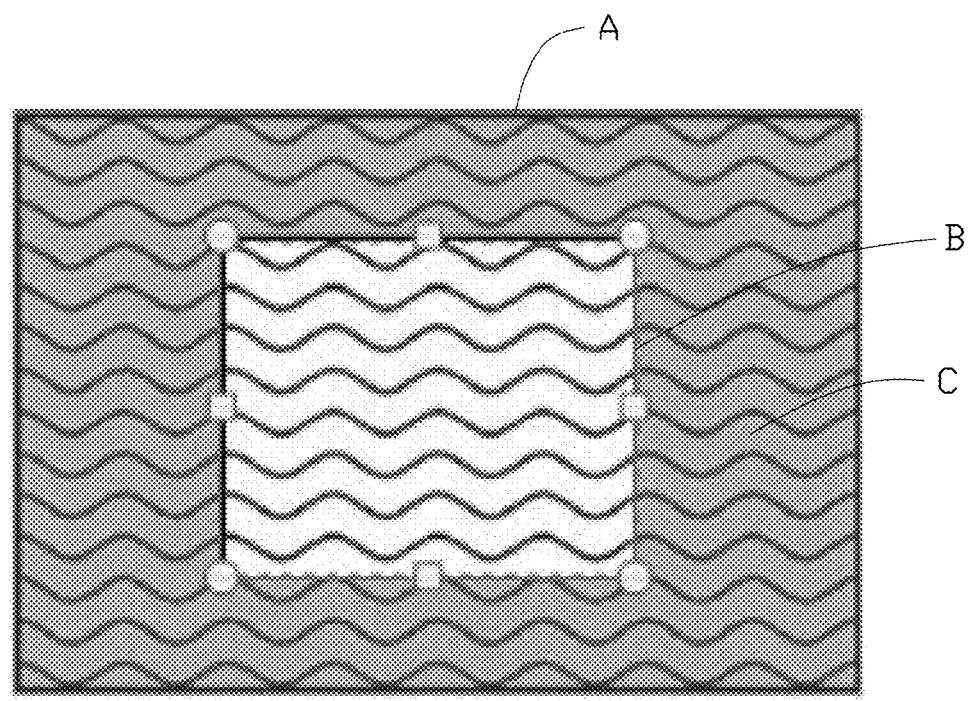
FIG. 2 is a schematic view of a picture displayed on a user interface.

Referring to FIG. 2, a picture A is displayed. The picture A includes a selected part B, which is selected by the selecting module 108, and a masked part C, which is masked by the drawing module 110. In one embodiment, the size of the frame surrounding the selected part B is capable of being adjusted according to the four pinnacles and the midpoints of four sides of the frame.

Figure 3:
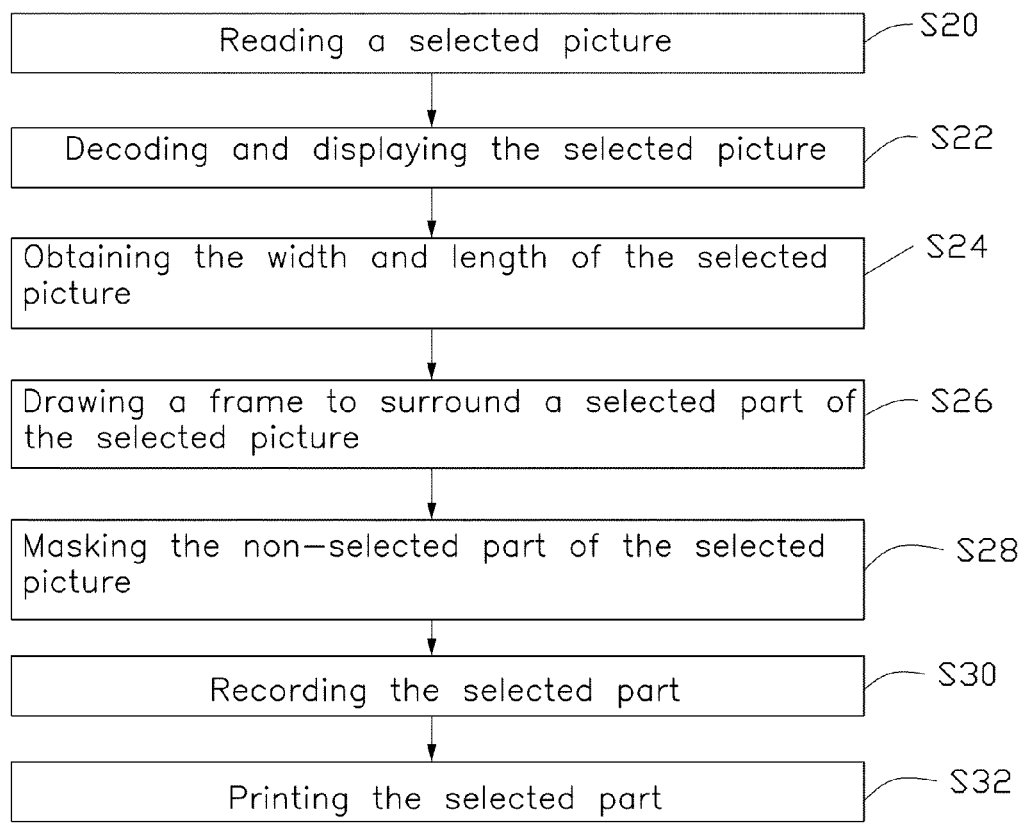
FIG. 3 is a flow chart of a printing method in accordance with an embodiment.

Referring to FIG. 3, a picture printing method, according to one embodiment, is shown bellow.

In step S20, the picture decoder 106 reads a selected picture from the storing module 102.

In step S22, the picture decoder 106 decodes the picture according to the coding format of the picture and displays the picture on the display 104.

In step S24, the picture decoder 106 obtains the width and length of the selected picture.

In step S26, the selecting module 108 draws a frame to surround a selected part of the selected picture.

In step S28, the drawing module 110 masks the non-selected part of the selected picture.

In step S30, the recorder records the selected part of the picture.

In step S32, the printing module prints the selected part of the picture.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A printer, comprising:
   a display;
   a storing module, the storing module configured to store a plurality of pictures;
   a picture decoder, the picture decoder configured to read a selected picture from the storing module, decode the selected picture, and display the selected picture on the display;
   a selecting module, the selecting module configured to draw a frame on the selected picture;
   a recorder, the recorder configured to record a selected part of the selected picture surrounded by the frame; and
   a printing module, the printing module configured to print the selected part;
   wherein the frame is rectangular, and a size of the frame is adjustable; and the recorder is configured to store coordinates of the frame in an extensible markup language file.

2. The printer of claim 1, further comprising a drawing module, wherein the drawing module is configured to mask a non-selected part of the selected picture.

3. The printer of claim 1, wherein the picture decoder is further configured to obtain a width and length of the selected picture.

4. A printing method, applied in a printer, comprising:
   reading a selected picture;
   decoding the selected picture;
   displaying the selected picture on a display;
   drawing a frame on the selected picture to surround a selected part of the selected picture, the frame is rectangular, and a size of the frame is adjustable according to the four pinnacles and the midpoints of four sides of the frame;
   recording the selected part surrounded by the frame on the selected picture; and
   printing the selected part.

5. The printing method of claim 4, further comprising masking a non-selected part of the selected picture after drawing the frame.

6. The printing method of claim 4, further comprising obtaining a width and length of the selected picture before drawing the frame.

7. A printing method, comprising:
   providing a printer, the printer comprising a display; a storing module; a picture decoder; a selecting module; a recorder; and a printing module;
   the picture decoder reads a selected picture;
   the picture decoder decodes the selected picture;
   the picture decoder displays the selected picture on the display;
   the selecting module draws a frame on the selected picture;
   the recorder records a selected part surrounded by the frame on the selected picture; and
   the printing module prints the selected part;
   wherein the frame is rectangular, and a size of the frame is adjustable; and the recorder is configured to store coordinates of the frame in an extensible markup language file.

* * * * *